United States Patent [19]

Nazuka

[11] 3,952,857
[45] Apr. 27, 1976

[54] MAGNETIC SUBSTANCE CONVEYING APPARATUS

[75] Inventor: Iwao Nazuka, Tokyo, Japan

[73] Assignee: Bunri Kogyo Kabushiki Kaisha, Tokyo, Japan

[22] Filed: Aug. 12, 1974

[21] Appl. No.: 496,581

[30] Foreign Application Priority Data
Mar. 22, 1974  Japan............................ 49-31497

[52] U.S. Cl................................ 198/41; 209/219; 209/227; 210/222
[51] Int. Cl.² ...................................... B03C 1/00
[58] Field of Search................... 198/41, DIG. 13; 209/214, 219, 227, 229, 220, 221; 210/222, 223

[56] References Cited
UNITED STATES PATENTS

| 2,002,978 | 5/1935 | Davis | 209/232 |
| 3,402,820 | 9/1968 | Lohmann | 210/222 |
| 3,712,472 | 1/1973 | Elliott | 198/41 |

FOREIGN PATENTS OR APPLICATIONS

| 401,301 | 11/1933 | United Kingdom | 209/219 |
| 21,276 | 9/1900 | United Kingdom | 209/220 |
| 47-21750 | 10/1972 | Japan | 198/41 |

*Primary Examiner*—Robert J. Spar
*Assistant Examiner*—James M. Slattery
*Attorney, Agent, or Firm*—Flynn & Frishauf

[57] ABSTRACT

In a magnetic substance conveying apparatus, to convey the magnetic substance along the outer periphery of an outer cylinder made of non-magnetic material by the relative rotational movement between the outer cylinder and an inner cylinder inside the outer cylinder and having magnets wound therearound in a spiral fashion, the angle of the spiral of the magnets wound over the inner cylinder gradually increases as the spiral advances toward the end thereof.

8 Claims, 8 Drawing Figures

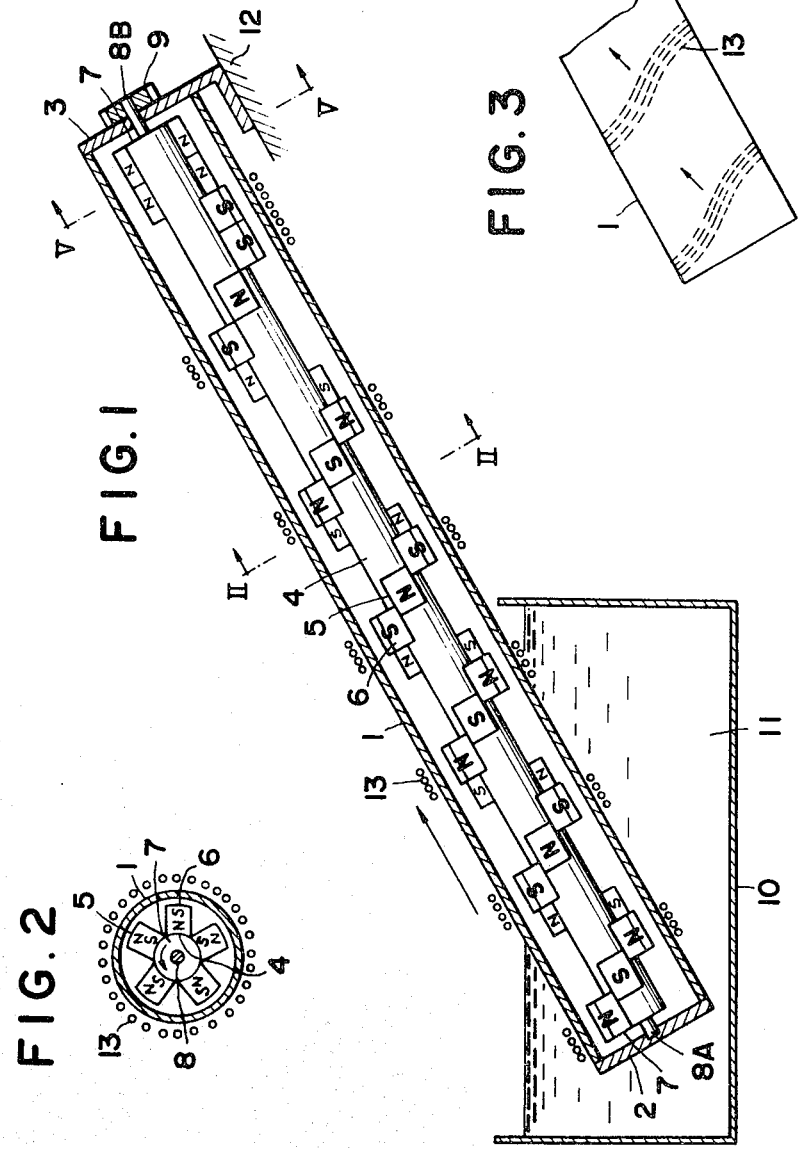

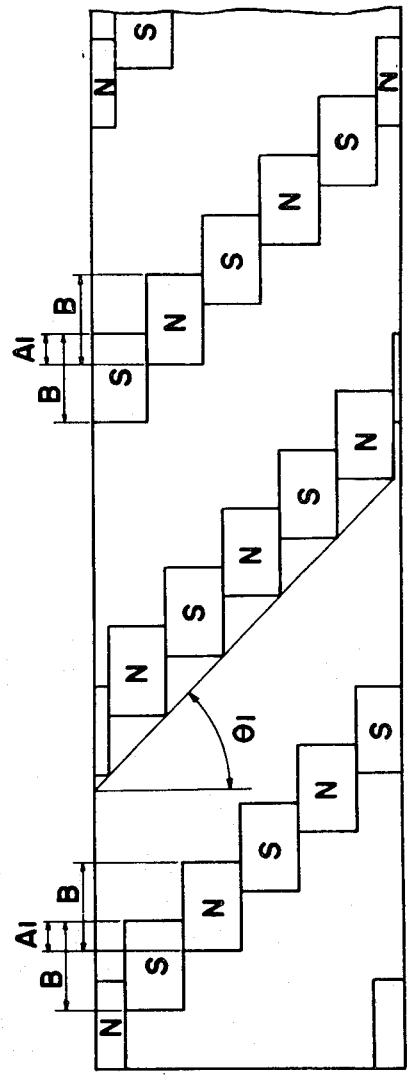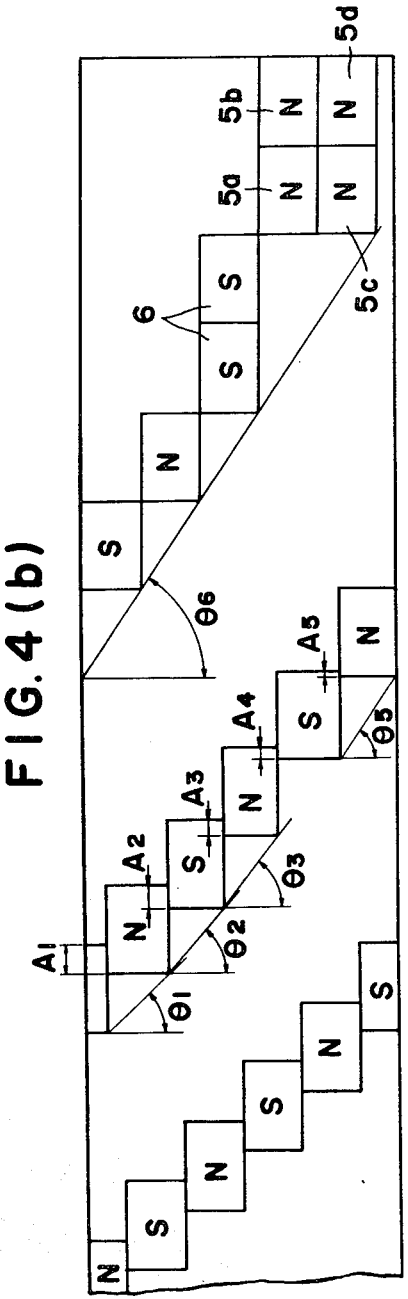

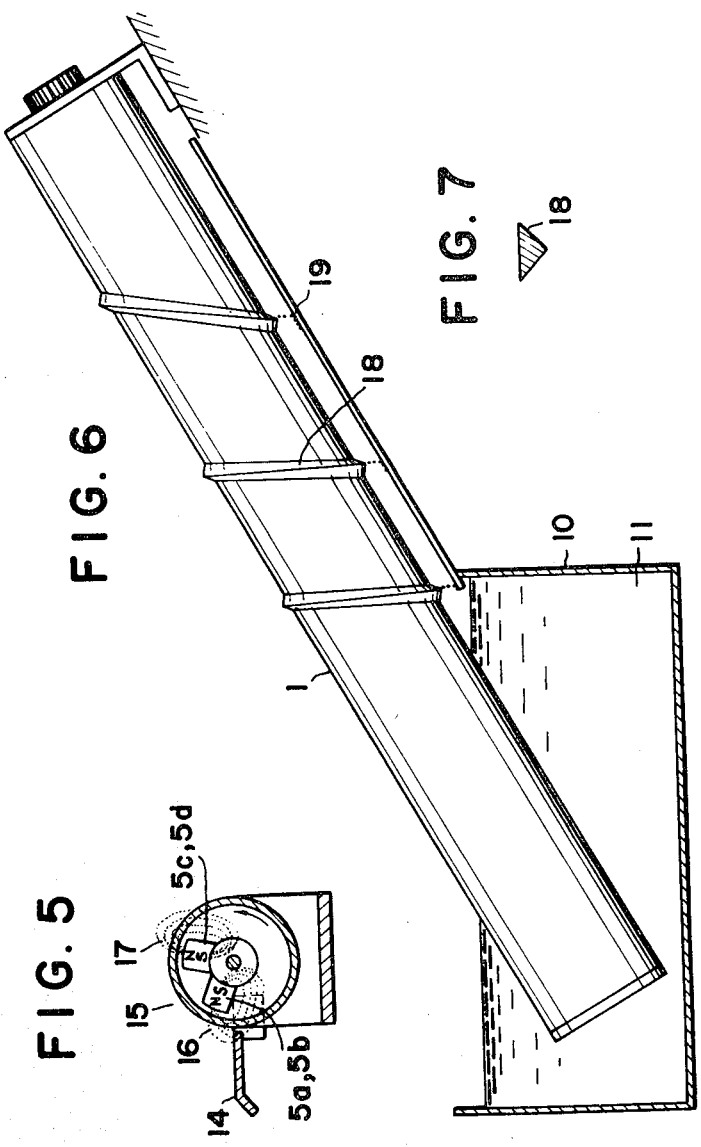

MAGNETIC SUBSTANCE CONVEYING APPARATUS

The present invention concerns a conveying apparatus for a magnetic substance, and more particularly it concerns a conveying appparatus for a magnetic substance which acts to adsorb and separate such magnetic substances as chips, parts and powders as well as to convey and remove the same which may be mixed with a cutting oil or liquid under operation.

A known magnetic substance conveying apparatus, comprises an inner cylinder around which magnets are wound in a spiral fashion and placed within an outer cylinder made of non-magnetic material, the magnetic substance being conveyed along the outer periphery of the said outer cylinder by the relative rotation between the said outer cylinder and the said inner cylinder. This conveying apparatus was found particularly superior in its efficient conveying action and simple structure. However, it was found that during experiments carried out with this type conveyer there was a difficulty encountered in scraping the magnetic substances off the outer cylinder as they had been attracted and conveyed by the outer cylinder resulting in some parts of the magnetic substances being sent back to their original position if scraping were not perfectly successful. It was also found that there was a need to effectively remove and recover the liquid such as cutting oil that had been conveyed with the magnetic substance.

Therefore, the object of the present invention is to provide a magnetic substance conveyor which may convey and separate the magnetic substances such as chips, parts and powders efficiently and in a great amount.

Another object of this invention is to provide a magentic substance conveyor which may be able to scrap off the magnetic substances from the outer cylinder, thus improving the efficient and smooth transportation of objects.

A further object of the present invention is to provide a magnetic substance conveyer which may effectively recover the cutting oil which has been conveyed with magnetic chips, parts and powders.

BRIEF DESCRIPTION OF THE DRAWINGS

Other objects and advantages of this invention will become apparent during the discussion of the accompanying drawings wherein:

FIG. 1 is a partially sectioned side view of one embodiment of the magnetic substance conveyer in accordance with the present invention with the arrangement of the magnets shown in a diagram;

FIG. 2 is a cross sectional view along the lines II — II in FIG. 1;

FIG. 3 is an explanatory diagram of the operation of the said embodiment;

FIG. 4 is a development of the arrangement of the magnets on the surface of the inner cylinder;

FIG. 5 is a cross sectional view along the lines V — V in FIG. 1;

FIG. 6 is a side view showing an embodiment of the present invention wherein an apparatus in accordance with the invention is wound with stripes; and FIG. 7 is a cross sectional view of the said stripe.

DETAILED DESCRIPTION OF ILLUSTRATED EMBODIMENTS

As shown in FIGS. 1 to 3, the two openings of the outer cylinder 1, which is comprised of non-magnetic material, are provided with side plates 2,3. Inside the said outer cylinder 1 is placed an inner cylinder 4, upon the outer periphery of which are place in a spiral fashion N, S magnets 5, 6 having differently oriented magnetic poles. Reference shall be made later to the details of the arrangement thereof. The side plates 7, 7 of the said inner cylinder 4 are fitted over and fixed to the axle 8 (8A, 8B) extending therethrough. One end 8A of the said axle 8 is attached to side plate 2 via a bearing and the other end 8B is attached with a gear 9 to be driven by such driving mechanism as a motor, etc. (not shown) as it passes through the side plate 3. The inner cylinder 4 around which are wound N, S magnets 5, 6 is rotated at a constant speed in the direction of an arrow as shown in FIG. 2 via the gear 9, etc. The left side of the said outer cylinder 1 (the opposite side to the side where the gear 9 is attached) is dipped in the cutting oil 11 recovered in the cutting oil tank 10 for machine tools. The side plate 3 on the right hand side is removably connected to any suitable point 12 such as the base for the machine tools. On the right hand side of the said outer cylinder 1 as seen in FIG. 1 is provided a scraper 14 (see FIG. 5) to scrape off the magnetic substances 13 attracted to the outer periphery of the outer cylinder 1 and fixed to the side plate 3 by bending one end thereof.

FIG. 4 is a development of the surface of the inner cylinder 4, wherein FIG. 4(a) shows the arrangement of magnets wound on the left side of the inner cylinder 4, and FIG. 4(b) shows the arrangement of magnets (permanent or electro-magnet) wound on the right side of the inner cylinder 4. On the left side of the cylinder 4, as is clear from FIG. 4(a), N, S magnets 5, 6 are alternatively placed in a spiral fashion one superposed on the other by about one third of the width of the magnets 5 and 6. The width A1 of the part where magnets 5, 6 are superposed is about one third B if the width thereof in the axial direction of the inner cylinder is shown as B. That is to say, the angle of the spiral at this point is $\theta_1$. On the right hand side of the inner cylinder 4, as is clear from FIG. 4(b), the superposed parts of N, S magnets 5, 6 at the last two threads of the spiral formed by the magnets 5, 6 are reduced successively in the order of A1, A2, A3, A4, and A5 and becomes zero at the last thread but join each other at the angle of magnets having different magnetic poles. In other words, the angles of the spiral, $\theta_1, \theta_2, \theta_3, \ldots \theta_6$ becomes gradually bigger.

At the last thread of the spiral, two S magnets 6 are lined directly while four N magnets 5 are superposed without providing superposition of the said two S magnets 6.

The operation of the apparatus of the present invention thus constructed is now explained. The cutting oil is recovered in the tank 10 while it contains magnetic substances 13, chips and powders, which generate from the working of machine tools. This recovered cutting oil 11 is cleaned by removing the said magnetic substance 13 and is recycled. The magnetic substances 13 in the said cutting oil are attracted and separated by the outer periphery of non-magnetic outer cylinder 1 by the magnetic force of the magnets 5, 6 placed over the inner cylinder 4 in a spiral fashion. As the inner cylinder 4 in the above stated position is driven and rotated in the direction of an arrow shown in the drawings, the said attracted magnetic substances 13 are transferred in the axial direction as they are wound in a substantially spiral fashion over the outer periphery of the said outer cylinder 1 as shown in FIG. 3 and gathered at the right hand side of the outer cylinder 1 as seen in FIG. 1 (upper oblique direction). The thus gathered magnetic substances 13 on the outer periphery of the right hand side are removed from the outer cylinder 1 by some suitable scraping mechanism, such as scraper 14 of FIG. 5, thus effecting the separation and conveyance of the magnetic substances 13 and cleaning of the cutting oil.

The arrangement of the magnets 5, 6 is such that the angle of the spiral at the part which attracts and conveys the magnetic bodies out of the cutting oil 11 (left side of the inner cylinder 4, see FIG. 4(b) is smaller while that at the part which sends the magnetic bodies 13 to be scraped (right side of the inner cylinder 4, see FIG. 4(b)) is bigger. Thus, the bigger pitches on the magnets at this point help to facilitate attraction, conveyance and scraping off of the magnetic substances in a large amount without being subject to the influence of magnetic force from other part of the magnets and it is quite easy to separate the magnetic substances 13 from the outer cylinder 1.

The magnets are arranged at the scraping part as shown on the right side of FIG. 4(b) and FIG. 5, where the two magnets 6 of S poles are not superposed upon each other while four magnets 5 of N pole, 5a, 5b, 5c and 5d, are superposed so that it has a magnetic attraction capacity two times greater than that of the said S pole magnets 6. Thus, the magnetic substances 13 attracted to the two S magnets 6 become separated into two groups of 5a, 5b and 5c, 5d of the N pole magnets 5 by the rotation of the inner cylinder 4 and become dispersed. That is to say, a sufficient amount of the magnetic substance 13 is stored at the scraping part of the magnets 5a to 5d so that it becomes easy to scrap the magnetic substance 13 off the same.

FIG. 5 explains how the magnetic substance 13 is scraped off. Since the 1st group of magnets 5a, 5b and the 2nd group of 5c, 5d have the same polarity, there is no line of magnetic force formed at the space 15 between the magnets of the two groups, but there is a repulsion against each other. That is, as the inner cylinder 4 rotates, the magnetic substance 13 attracted to the 1st group of magnets 5a, 5b are scraped off by the scraper 14. Since there is a repulsive state at the space 15 between the magnets, there cannot be left any magnetic substances 13 of the 1st group unscraped, but the scraping is all the more encouraged. And since the strength of the magnetic flux at the adjacent parts 16, 17 to the 1st and the 2nd groups is strong, scraping is also made easier. The remaining half of the magnetic substances 13 of the 2nd group is now scraped by the scraper 14 as the inner cylinder 4 rotates, and here again the scraping is easily performed because of the amount being only one half, of the great force of the magnetic flux, and because there are not further magnets left behind. If there should remain any magnetic substance unscraped, they are transferred back to the direction reverse to the conveyer, and the magnets at this part will have to attract more magnetic substances exceeding their capacity and stop the conveyance of the magnetic substance 13. Since the apparatus in accordance with the present invention will have few magnetic substances remaining unscraped, there is little chance of conveyance becoming suspended.

As has been mentioned hereinabove, the rotation of the inner cylinder 4 causes the transfer of magnetic substance 13 in the axial direction as it advances in a substantially spiral fashion around the outer periphery of the outer cylinder 1. The magnetic substance 13 in this process is present in the cutting oil 11. The method of recovering the cutting oil thus transferred with the magnetic substance 13 is now explained.

The magnetic substance 13 such as chips, parts and powders are transferred on the surface of the outer cylinder 1 substantially perpendicular to the spiral of the magnets 5, 6 and a stripe 18 as shown in FIG. 6 is placed over the part of the surface of the outer cylinder 1 in a spiral substantially perpendicular to the spiral of the magnets 5, 6 so that most of the magnetic substances 13 can rise without being prevented from doing so by the stripe 18. There is provided a runner 19 for recovering the cutting oil 11 dropping along the stripe 18 into the tank 10. Thus, cutting oil 11 transferred together with the magnetic substance 13 flows into the runner 19 via the stripe 18 and is recovered in the tank 10. The material of the stripe 18 may be rubber, textile, non-magnetic metals etc. having a cross section in a triangle as shown in FIG. 7 of the drawings, or in a circle or a rectangle, or in any other forms. However, the triangle is particularly suitable for dropping of the cutting oil. If an apparatus to drive the inner cylinder 4 intermittently by electrical or mechanical means using a timer or a Geneva mechanism (not shown) is provided, the magnetic substance 13 (FIGS. 1 and 2) attracted to the outer cylinder 1 would be stationary while the inner cylinder 4 is stationary, and the cutting oil transferred with the magnetic substance will be separated from the magnetic substance and go down along the stripe 18 to the runner 19 alone, thereby encouraging the recovery of the cutting oil.

The present invention is in no way limited to the above-mentioned embodiment, but the outer cylinder 1 may be rotated while the inner cylinder 4 is fixed to feed the magnetic substance 13 in the axial direction around the outer periphery of the outer cylinder. The above mentioned arrangement of the magnets 5, 6 is a mere example and various arrangements are feasible without departing from the true spirit of the present invention.

As is clear from the above description, the angle of the spiral at the end of the spirally wound magnets over the inner cylinder is larger than that at the beginning part so that it is possible to attract, transfer and separate a great amount of magnetic material and improve the efficiency of the machine. The larger capacity of the magnets wound over the inner cylinder corresponding to the part scraping the magnetic substance attracted on the outer periphery of the outer cylinder will eliminate any unscraped magnetic material remaining and prevent the suspension of the transferring function as the magnetic substances are conversely transferred.

A stripe or stripes wound over a part of the surface of the outer cylinder will help to recover the cutting oil effectively which has been transferred along with the magnetic substance.

What I claim is:

1. In a magnetic substance conveying apparatus for conveying a magnetic substance from a first position to a second position, comprising:

an inner cylinder having magnets spirally wound thereon;

an outer cylinder made of non-magnetic material and surrounding said inner cylinder over at least a portion of the length of said inner cylinder; and means for providing relative rotational movement between said outer cylinder and said inner cylinder for conveying the magnetic substance along the outer periphery of said outer cylinder;

the improvement wherein the angle of the magnet spiral at the end portion thereof, in the vicinity of said second position, is larger than the angle of the magnet spiral at the beginning portion thereof.

2. In the magnetic substance conveying apparatus according to claim 1, the improvement wherein the capacity of the magnets wound over the part of said inner cylinder corresponding to the part where the magnetic substances attracted to the outer periphery of said outer cylinder are scraped off is larger than that of the magnets at the other parts of said inner cylinder.

3. In the magnetic substance conveying apparatus according to claim 1, the improvement comprising at least one stripe spirally wound over at least a part of the surface of said outer cylinder with the angle of spiral thereof substantially perpendicular to the angle of the spiral of said magnets wound over said inner cylinder.

4. In the magnetic substance conveying apparatus according to claim 3, the improvement wherein said means for providing relative rotational movement comprises means for intermittently suspending the relative rotational movement between said outer cylinder and said inner cylinder.

5. In the magnetic substance conveying apparatus according to claim 1, the improvement wherein the angle of the spiral of the magnets wound over said inner cylinder gradually increases as the spiral advances toward the end thereof.

6. In the magnetic substance conveying apparatus according to claim 1, the improvement wherein said magnets comprise a plurality of magnets mounted successively adjacent each other to form a spiral over the outer surface of said inner cylinder.

7. In the magnetic substance conveying apparatus according to claim 1, the improvement wherein said means for providing relative rotational movement comprises means for rotating said inner cylinder, said outer cylinder being maintained stationary.

8. In the magnetic substance conveying apparatus according to claim 2, the improvement further comprising means located adjacent the end of said spirally wound magnets for scraping magnetic substances off the outer surface of said outer cylinder.

* * * * *